(12) United States Patent
Takahashi

(10) Patent No.: US 6,208,055 B1
(45) Date of Patent: Mar. 27, 2001

(54) ELECTROMAGNETIC TRANSDUCER AND ELECTRONIC DEVICE INCLUDING THE TRANSDUCER

(75) Inventor: Osamu Takahashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/407,530

(22) Filed: Sep. 28, 1999

(30) Foreign Application Priority Data

Oct. 1, 1998 (JP) .................................................. 10-280371
Jun. 23, 1999 (JP) .................................................. 11-177080

(51) Int. Cl.⁷ .............................. G04C 10/00; H02K 1/22
(52) U.S. Cl. ........................... 310/156; 310/261; 310/268
(58) Field of Search ..................................... 310/156, 261, 310/268, 49 R

(56) References Cited

U.S. PATENT DOCUMENTS

| 3,293,023 | * | 12/1966 | Kober ..................... 310/268 |
| 5,492,572 | | 2/1996 | Schroeder et al. .................... 148/103 |
| 5,892,307 | * | 4/1999 | Pavlovich et al. ................. 310/68 B |
| 6,037,696 | * | 3/2000 | Sromin et al. ........................ 310/268 |

FOREIGN PATENT DOCUMENTS

| 18 11 389 | 5/1960 | (DE) . |
| 2 149 673 | 3/1973 | (DE) .............................. H02K/37/00 |
| 0 751 445 | 1/1997 | (EP) .............................. G04C/10/00 |
| 2 076 493 | 10/1971 | (FR) . |
| 2 142 466 | 1/1973 | (FR) ................................ A61B/6/00 |
| 2 497 021 | 6/1982 | (FR) . |
| 8-75874 | 3/1996 | (JP) ................................ H02K/7/18 |
| 9-211152 | 8/1997 | (JP) ................................ G04C/10/00 |
| WO 84/01041 | 3/1984 | (WO) . |

OTHER PUBLICATIONS

J. Born, et al., Salto: An Automatic Winding Mechanical Movement Having The Precision Of A Quartz Movement, SHM Research and Development Laboratory, Asulab S.A., Oct. 2, 1997.

* cited by examiner

Primary Examiner—Burton Mullins
(74) Attorney, Agent, or Firm—Michael T. Gabrik

(57) ABSTRACT

The invention provides an electromagnetic transducer which can improve conversion efficiency by reducing the weight of a rotor and thinning a rotor shaft to reduce both size and weight. An electromagnetic transducer includes a rotor comprising a plurality of magnets with N and S poles arrayed alternately in the direction of rotation of the rotor, and a back yoke for supporting the plurality of magnets. The back yoke is formed with reduced volume regions corresponding to the center of each magnet as viewed in plan based on distribution of magnetic force lines generated inside the back yoke between the N and S poles of the adjacent magnets. With such a reduction of the back yoke, the weight of the back yoke and hence the overall weight of the rotor can be reduced while the magnetic force lines flowing into the magnet are prevented from being saturated.

23 Claims, 11 Drawing Sheets

ELECTROMAGNETIC TRANSDUCER AND ELECTRONIC DEVICE INCLUDING THE TRANSDUCER

BACKGROUND OF THE INVENTION

1. Field of the Invention

The present invention relates to an improved electromagnetic transducer which includes a rotor and a coil, and which reciprocally transduces kinetic energy generated due to rotation of the rotor to electrical energy generated in the coil. More particularly, the present invention provides an electromagnetic transducer with improved energy conversion efficiency and to electronic devices which employ the improved transducer.

2. Description of the Related Art

Heretofore, an electromagnetic transducer has been utilized which transduces changes in magnetic flux due to rotation of a rotor into electrical energy, or conversely transduces electrical energy into rotary power. Examples of such an electromagnetic transducer employed in a multipolar power generator are described in, e.g., Japanese Unexamined Patent Publication Nos. 8-75874 and 9-211152, and in a paper in Proceedings of The Swiss Society of Chronometry reported by Asulab S. A. on Oct. 2, 1997.

Each of these multipolar power generators comprises a plurality of magnets rotatably supported about a predetermined axis and arranged on a plane perpendicular to the predetermined axis with N and S poles arrayed alternately in the direction of rotation, a rotor having a back yoke made of soft iron supporting the plurality of magnets, and a coil made up of windings and arranged near the rotor. With this type of multipolar power generator, when the rotor is rotated with a mechanical energy source, such as a barrel main spring, the magnetic flux near the coil is changed with the rotation of the rotor, and an induced current flows through the coil windings by electromagnetic induction.

The above-described multipolar power generator is suitable as a power supply source for, e.g., a speed-governing control circuit of an electronically controlled watch or the like because inductive electromotive forces can be generated with stability by such an arrangement where the plurality of magnets are arranged with N and S poles arrayed alternately in the direction of rotation. Also, compared with a conventional power generator which comprises a rotor, a metal-made core arranged near the rotor, and a stator including a coil wound over another portion of the core, a power generator producing no iron loss and having higher efficiency of power generation can be realized by not employing a metal core. Alternatively, by not arranging a metal-made core near the rotor, a power generator having a small cogging torque and very excellent startability can be achieved.

However, the following problems are experienced in the electromagnetic transducer described above.

(1) Because the rotor includes the back yoke made of soft iron and the plurality of magnets arranged on the back yoke as described above, the rotor has increased weight. Accordingly, a rotor shaft supporting those components is required to have a diameter of sufficient size and durability to accommodate the increased weight. An increase in diameter of the rotor shaft increases the contact area between the shaft, a main plate and a bearing support seat which hold the rotor shaft. Correspondingly, the rotation of the rotor is restricted and the power generation efficiency of the multipolar power generator is reduced.

(2) To rotate the more weighty rotor with stability, a bearing portion formed in the main plate, etc. must be an anti-vibration bearing, which has been used in conventional mechanical watches, for the purpose of improving anti-vibration ability and anti-impact ability. This results in increased thickness of the multipolar power generator.

The above problems are also similarly encountered when an electromagnetic transducer is employed as a motor using electrical energy as a power source.

SUMMARY OF THE INVENTION

Objects of the Invention

Therefore, it is an object of the present invention to overcome the aforementioned problems.

Another object of the present invention is to provide an electromagnetic transducer with improved conversion efficiency by reducing the weight of the rotor and thinning the rotor shaft, thereby resulting in reduction of both size and weight.

To achieve the above objects, the present invention provides an electromagnetic transducer comprising a rotor and a coil which reciprocally transduces kinetic energy generated by rotation of the rotor to electrical energy generated in the coil. The rotor comprises a rotor shaft serving as the center of rotation, and a back yoke including a magnetic body with N and S poles arrayed in the direction of rotation of the rotor, with the magnetic body being held in close contact with the back yoke. The back yoke is formed with reduced volume regions, each of which is aligned with one of the poles based on distribution of magnetic force lines generated inside the back yoke. The back yoke can be reduced to such an extent that the magnetic flux is not saturated at a close contact portion between the back yoke and the magnetic body. More concretely, the volume and weight of the back yoke can be reduced by forming cutouts in the circumferential edge of the back yoke, or by forming recesses in the back yoke, or by forming holes in a portion of the back yoke inward of the magnetic body.

Here, the term "electromagnetic transducer" includes a power generator for converting mechanical energy in a rotating rotor, supplied from a driving mechanism such as a main spring, to electrical energy in a coil, and a motor for applying electrical energy, supplied from an electrical source, to a coil to rotate a rotor and generate mechanical energy.

Also, the magnetic body is only required to satisfy such an arrangement that N and S poles are arrayed in the direction of rotation of the rotor. For example, the magnetic body can be constructed by magnetizing a surface of an annular magnetic body into a plurality of poles, or by incorporating a plurality of magnets with N and S poles arrayed alternately on the back yoke.

With the above features of the present invention, the back yoke is reduced to such an extent that the magnetic flux inside the back yoke is not saturated, thereby its weight and hence the overall weight of the rotor. Correspondingly, the rotor shaft can be thinned, and the efficiency of power generation and the driving efficiency of the motor can be improved. In addition, a reduction in the weight of the rotor contributes to simplifying and downsizing the structure of an antivibration bearing, thus resulting in a further reduction of both size and weight of the electromagnetic transducer.

When the magnetic body is constructed by magnetizing a surface of an annular magnetic body into a plurality of poles, a multipolar rotor can be formed just by magnetizing one magnetic body, and the rotor as one component of the electromagnetic transducer can be manufactured with ease.

When the magnetic body is constructed by a plurality of magnets with N and S poles arrayed alternately on the back yoke, the magnets are only required to be in the least necessary portions; that is, the magnets need only occupy a small portion 35 of the total area in which the magnets may be placed and still be operative. Therefore, the weight of the rotor can be further reduced.

The following arrangements may be used to realize the above feature where the volume and weight of the back yoke is reduced based on magnetic force lines.

(1) The reduction can be accomplished by forming cutouts in the back yoke extending from an outer periphery of the back yoke toward the center of the rotation and aligned with the centers of the poles of the magnetic body in one-to-one relation.

(2) The reduction can also be accomplished by forming recesses in one surface of the back yoke in one-to-one relation to the centers of the poles of the magnetic body with the other surface being held in contact with the magnetic body.

(3) When the magnetic body is constructed by a plurality of magnets with N and S poles arrayed alternately on the back yoke, the volume and weight of the back yoke can be reduced by forming cutouts in an outer peripheral edge of the back yoke at positions based on the arrangement of the plurality of magnets on the back yoke.

(4) When the magnetic body is constructed by a plurality of magnets with N and S poles arrayed alternately on the back yoke, its volume and weight can be reduced by forming holes in the back yoke at positions inward of the magnets based on the arrangement of the plurality of magnets on the back yoke.

(5) When the magnetic body is constructed by a plurality of magnets with N and S poles arrayed alternately on the back yoke, its volume and weight can be reduced by forming a plurality of recesses in the back yoke to receive the plurality of magnets for mutual fitting in one-to-one relation.

With arrangements (1), (2) and (5), since the density of magnetic line forces in the direction of thickness of the back yoke and between the adjacent N an S poles is low in a portion just under the center of each pole of the magnetic body, the weight of the back yoke can be reduced as much as desired so long as the magnetic flux is not saturated in that portion. Further, even with a reductions specified herein, the magnetic flux inside the back yoke is not saturated and therefore the magnetic flux radiated from the magnetic body is not decreased.

With arrangements (3) and (4), since there is a portion of the back yoke held in close contact with the magnetic body where the density of magnetic line forces is low, the weight of the back yoke can be reduced by forming cutouts or holes in the low magnetic density area of the back yoke to such as extent that the magnetic flux is not saturated. As with the above, the magnetic flux radiated from the magnetic body is not decreased.

Of the above arrangements for reducing the back yoke, arrangement (5), which involves forming a plurality of recesses in the back yoke to receive the magnets for mutual fitting, also increases the contact area between the magnet and the back yoke. Accordingly, a path through which the magnetic force lines inside the back yoke flow is increased. Correspondingly, the magnetic flux radiated from the magnet toward the coil is increased, resulting in an electromagnetic transducer with high power generation efficiency and high driving efficiency.

Also, with the provision of the recesses to receive the magnets for mutual fitting, movement of the magnets along the surface of the back yoke held in contact with the magnets is restricted. Therefore, the magnets can be held on the back yoke at predetermined positions with no need to bond the magnets to the back yoke using an adhesive or the like. This increases the efficiency in manufacture of the rotor.

Preferably, the recesses are each formed such that a width of each recess in the direction perpendicular to the direction of depth thereof gradually decreases toward the bottom of the recess, and a portion of each of magnet which is fitted into each recess is configured corresponding to the shape of the recess.

With the recesses having such a shape, the magnetic force lines flowing inside the back yoke are allowed to smoothly flow into the magnet in the direction perpendicular to the end surface of the portion of the magnet which is fitted into the recess. Accordingly, the magnetic force lines radiated from the magnet to the coil are further increased, resulting in an electromagnetic transducer with higher power generation efficiency and higher driving efficiency. In particular, by forming the recess to have a curved surface and forming the fitted portion of the magnetic body to have a shape corresponding to the curved surface, the direction of incidence of magnetic force lines from the back yoke to the magnetic body can be aligned with the direction normal to the surface of the magnetic body. This result is effective in increasing magnetic force lines radiated from the magnetic body.

Preferably, the depth of the recesses is set depending on a boundary between the poles of each of the magnets fitted into the recesses. More concretely, considering a cylindrical magnet having poles on its upper and lower surfaces, it is preferable that the boundary between the poles be formed substantially at the middle of a cylindrical shape, and the depth of the recesses be set slightly smaller than the height of half of the cylindrical magnet.

If the boundary between the poles is embedded within the back yoke, the poles would be subject to twisting and the magnetic force lines inside the back yoke would not efficiently flow in the magnet. By setting the depth of the recesses as mentioned above, the magnetic force lines inside the back yoke are allowed to flow into the magnets more efficiently. As with the above feature, therefore, an electromagnetic transducer with high power generation efficiency and high driving efficiency can be realized.

Preferably, the recesses and the magnets are formed to have a circular shape.

By forming the recesses and the magnets to have such a shape, manufacture of the back yoke and the magnets can be facilitated.

When the rotor includes a pair of back yokes arranged in opposed relation with coils disposed therebetween, the rotor shaft preferably includes positioning means for determining relative positions of the pair of back yokes. More specifically, the relative positions of the pair of back yokes are set such that N poles of the magnetic body disposed on one of the back yokes are arranged in opposed relation, viewed in plan, to the S poles of the magnetic body disposed on the other.

Stated another way, since the relative positions of the pair of back yokes can be precisely positioned by the positioning means, each pair of magnets disposed on the pair of back yokes can be arranged in precisely opposed relation. It is therefore possible to render magnetic force lines to penetrate the coil and the pair of yokes with high density, and to develop large changes of the magnetic flux in the coil.

The positioning means preferably includes a rotor shaft formed to have a polygonal shape in a radial section, and polygonal holes formed in the pair of back yokes to receive the rotor shaft for mutual fitting.

In other words, just by forming the rotor shaft to have the predetermined shape, the relative positions of the pair of back yokes can be determined with high accuracy, and the manufacturing process can be facilitated.

Preferably, the specific shape of the polygonal holes is based on the arrangement of the plurality of magnets which are positioned to lie on lines extending outwardly from the apexes of the polygonal shape at the center of rotation in one-to-one relation.

By arranging the polygonal holes in such a way, the relative positions of the pair of back yokes can be determined with high accuracy. Further, by arranging the magnets in relationship to the apexes of the polygonal hole, the weight of the back yoke can be reduced by cutting out portions of the back yoke which are positioned inward of the plurality of magnets and in which the density of magnetic force lines is low, thereby reducing the back yoke, as with the above case of forming the holes in the back yoke at positions inward of the magnets.

Moreover, an electronic device according to the present invention may employ any of the electromagnetic transducers described above. More specifically, any of the electromagnetic transducers can be employed as a power generator for supplying power to an electronic device such as an electrically controlled watch or a cellular phone. By doing so, the weight and size of the electronic device can be reduced corresponding to the reduction in weight and size of the electromagnetic transducer.

Preferably, any of the electromagnetic transducers is employed as a power supply source of an electronic device in which the rotor is rotated by transmitting kinetic energy accumulated in a main spring to the rotor through train wheels, for example, an electronically controlled mechanical watch in which a speed-governing function is electrically controlled.

By employing any of the electromagnetic transducers in such an electronically controlled mechanical watch, since power is only required to be supplied to a circuit section constituting the speed-governing function, the weight and size of the electromagnetic transducer can be further reduced.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

Preferred embodiments of the present invention will be described below with reference to the drawings.

Figure 1:
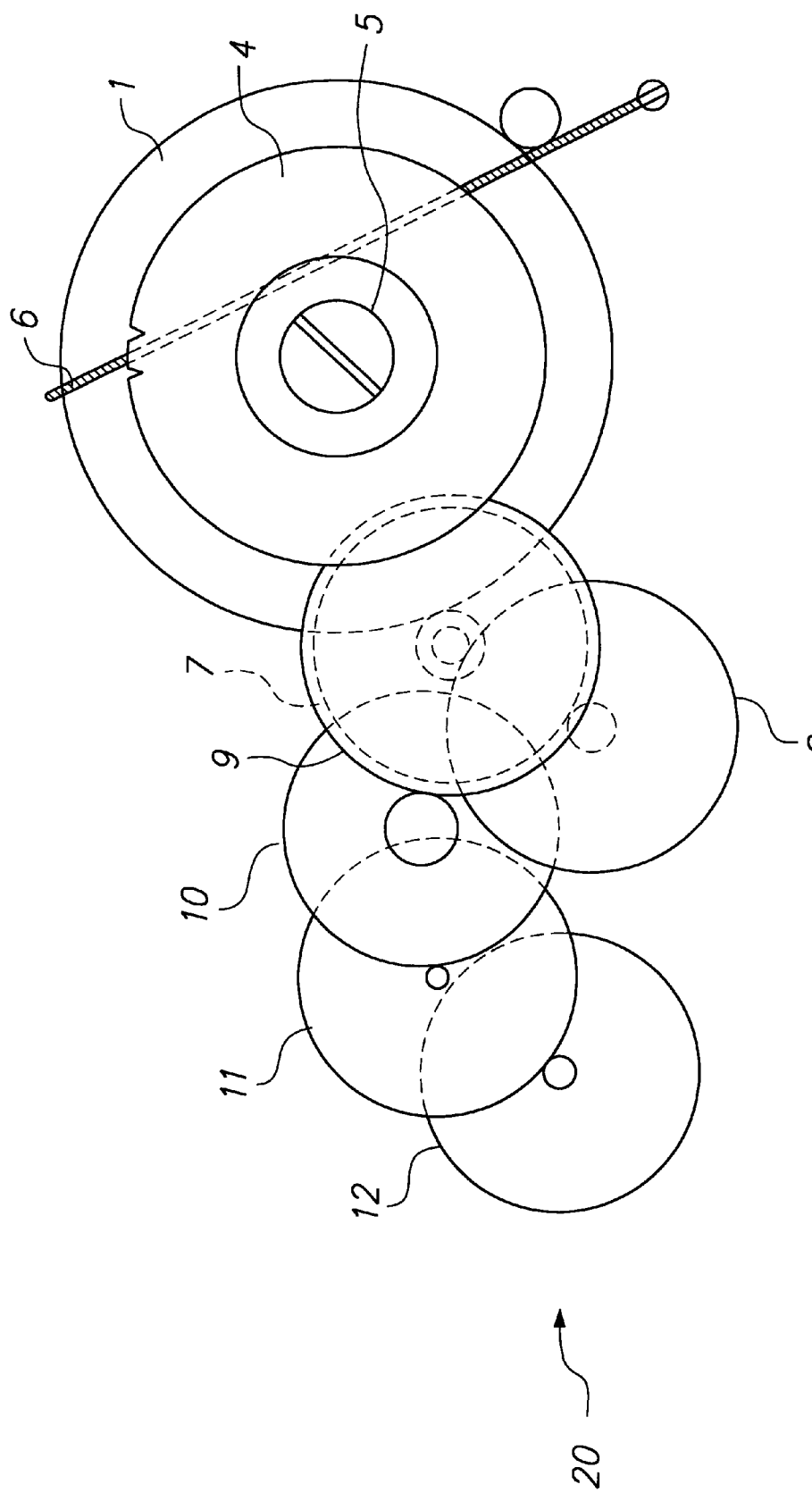
FIG. 1 is a plan view showing the structure of an electronic device utilizing a multipolar power generator according to a first embodiment of the present invention.
Figure 2:
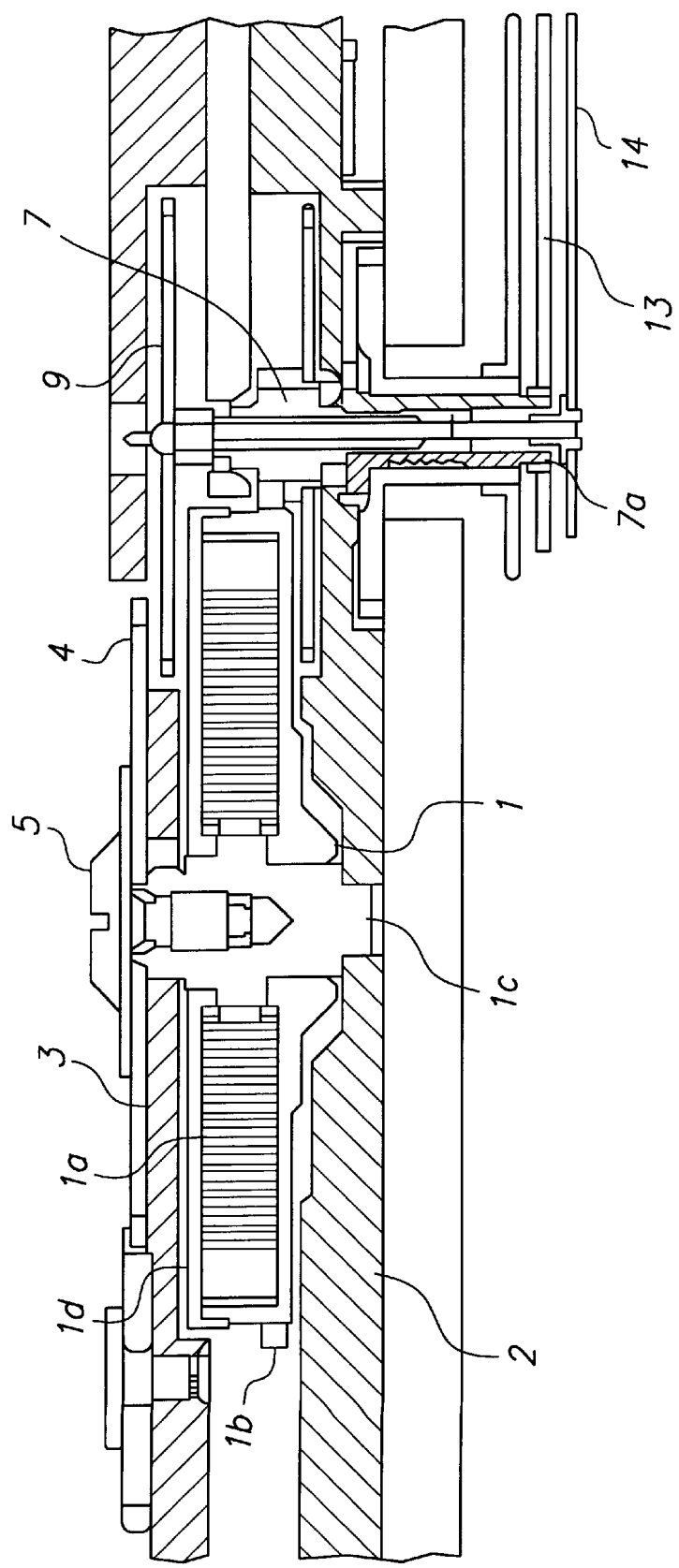
FIG. 2 is a sectional view showing the structure of the electronic device according to the first embodiment.
Figure 3:
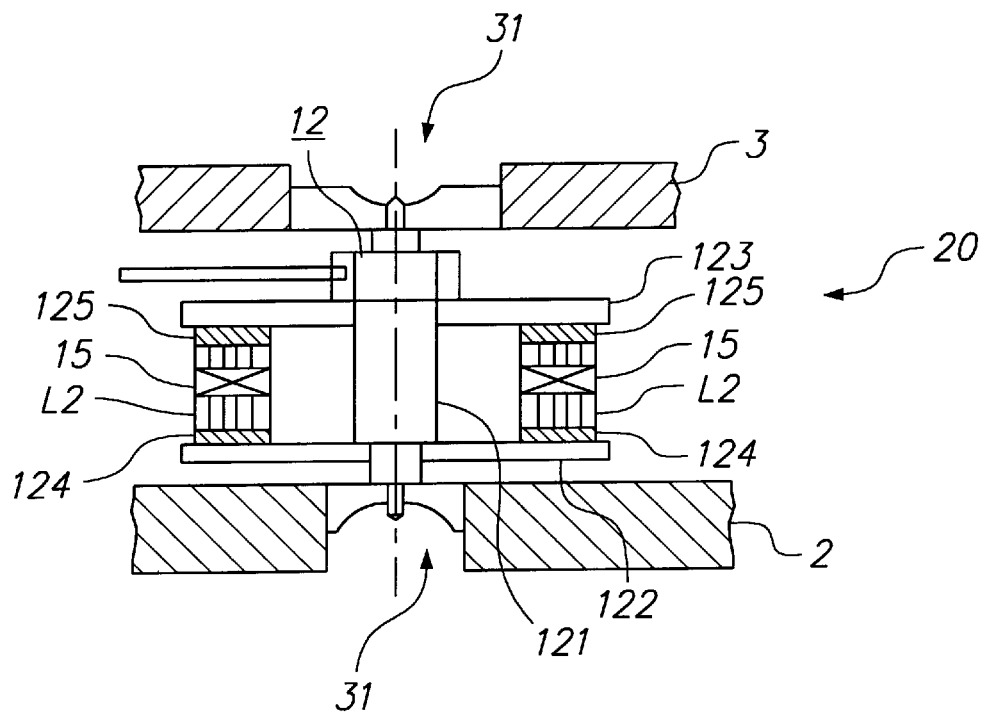
FIG. 3 is a sectional view showing the structure of the multipolar power generator according to the first embodiment.

FIG. 1 is a plan view showing principal components of an electronically controlled mechanical watch as one example of an electronic device utilizing an electromagnetic transducer according to a first embodiment of the present invention. FIGS. 2 and 3 are sectional views showing some of these components.

The electronically controlled mechanical watch includes a movement barrel 1 comprising a main spring 1a, a barrel gear 1b, a barrel arbor 1c, and a barrel cover lid. The main spring 1a is fixed at its outer end to the barrel gear 1b and at its inner end to the barrel arbor 1c. The barrel arbor 1c is supported by a main plate 2 and a train wheel bridge 3, and is fixed by a ratchet wheel screw 5 for rotation with a ratchet wheel 4.

The ratchet wheel 4 is held in mesh with a click 6 so that the ratchet wheel 4 is allowed to rotate in the clockwise direction, but is checked from rotating in the counterclockwise direction. The manner in which the main spring 1a is wound by rotating the ratchet wheel 4 in the clockwise direction is similar to that in the automatically or manually winding mechanism in a mechanical watch, and therefore is not described here.

The rotation of the barrel gear 1*b* is transmitted to a second (center) wheel 7 after being sped up 7 times, to a third wheel 8 after being sped up 6.4 times, to a fourth (second) wheel 9 after being sped up 9.375 times, to a fifth wheel 10 after being sped up 3 times, to a sixth wheel 11 after being sped up 10 times, and to a rotor 12 after being sped up 10 times, successively. Thus, the rotation of the barrel gear 4 is transmitted through wheels 7–11 which constitute a speed-up train wheel, and is sped up 126,000 times in total.

An hour pinion 7*a* is fixed to the second wheel 7, a minute hand 13 is fixed to the hour pinion 7*a*, and a second hand 14 is fixed to the fourth wheel 9. Therefore, the rotor 12 is controlled to rotate at 5 rps so that that the second wheel 7 rotates at 1 rph and the fourth wheel 9 rotates 1 rpm. Under this condition, the barrel gear 1*b* rotates at 1/7 rph.

The electronically controlled mechanical watch includes a power generator 20 in the form of a multipolar power generator which comprises the rotor 12 and a stator 15.

Figure 4:
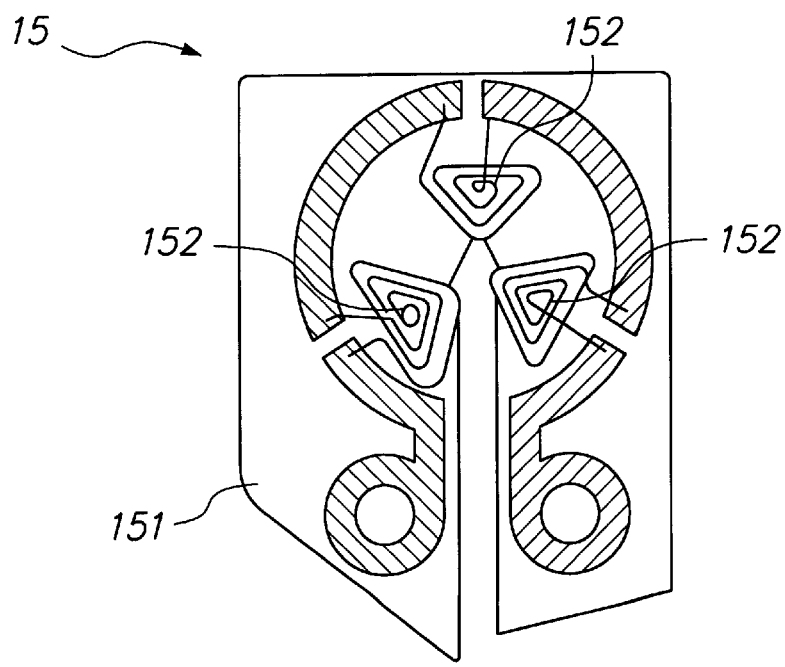
FIG. 4 is a plan view showing the structure of a stator as one component of the multipolar power generator according to the first embodiment.

The stator 15, fixedly positioned on the main plate 2, is disposed between a pair of back yokes 122 and 123 which are components of the rotor 12. As shown in FIG. 4, the stator 15 comprises a base plate 151 made of an insulating material such as a glass fabric base epoxy resin, and coils 152 wound to occupy an overall thickness of the base plate 151. In such a stator 15, power loss can be reduced because a magnetic circuit comprising the stator 15 has no core generating an iron loss. Also, in the power generator 20 including such a stator 15, the number of windings subject to the magnetic flux can be reduced, and therefore power loss due to coil resistance can also be reduced. Namely, the power generator 20 is a generator capable of accommodating a large current with ease.

The rotor 12 comprises a rotor shaft 121 rotatably held by the main plate 2 and the train wheel bridge 3, a pair of back yokes 122, 123 fixed to the rotor shaft 121, and a plurality of magnets 124, 125 respectively disposed on the pair of back yokes 122, 123 and arranged in opposing relationship. The rotor shaft 121 is connected to the main plate 2 and the train wheel bridge 3 through an antivibration bearing 31. Though not shown in FIGS. 1 to 3, the anti-vibration bearing 31 comprises a double guide cone comprised of a body and a bearing support seat, and a leaf spring provided between the body and the bearing support seat. When an impact is externally transmitted to the anti-vibration bearing 31 through the main plate 2 and the train wheel bridge 3, the leaf spring absorbs the impact and prevents vibrations from being transmitted to the rotor shaft 121.

The opposing magnets 124, 125 are arranged such that opposite poles face each other and magnetic force lines L2 generated between the magnets 124 and 125 penetrate the stator 15 interposed between the pair of back yokes 122, 123.

Figure 5:
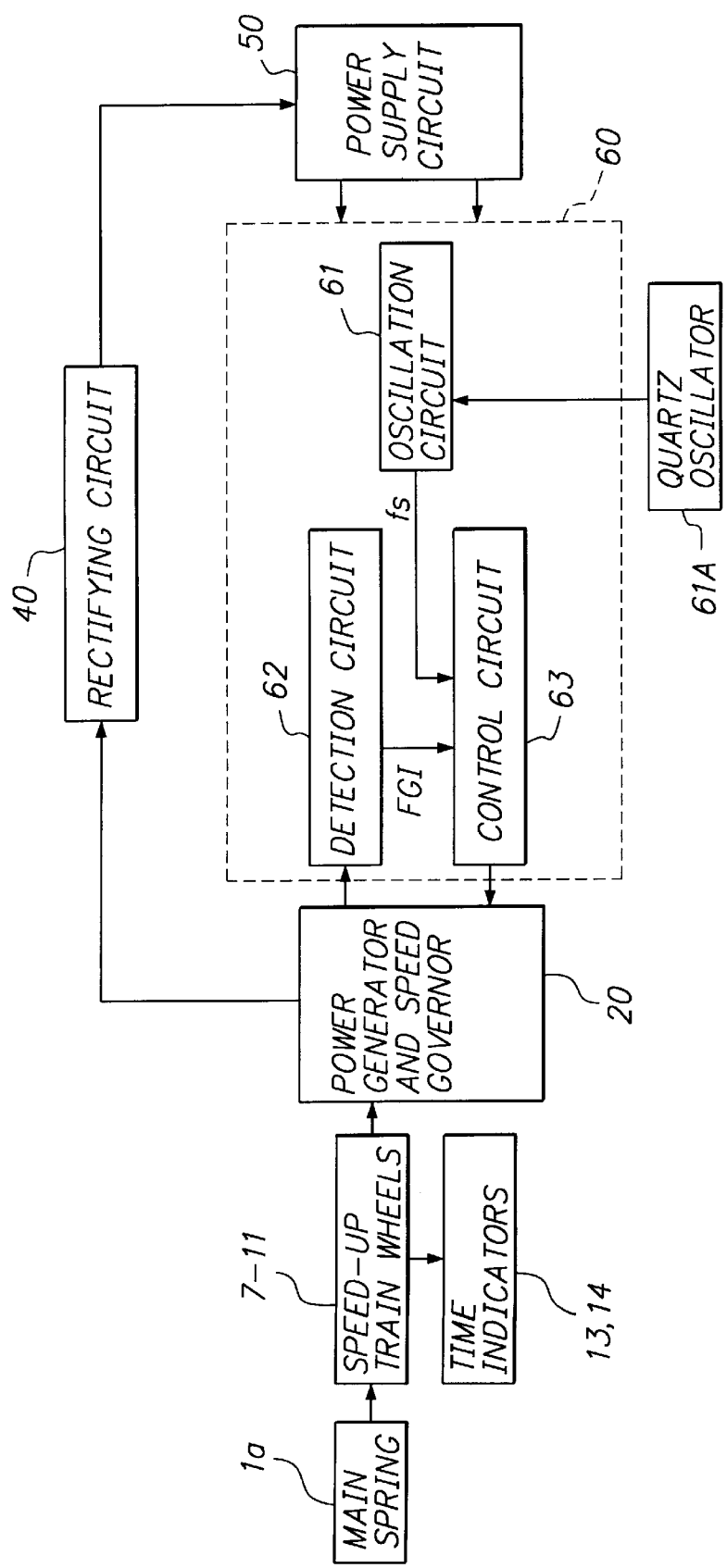
FIG. 5 is a block diagram showing the control mechanism of the multipolar power generator according to the first embodiment.

In addition to the main spring 1*a*, the speed-up train wheels 7–11, and the power generator 20, as shown in FIG. 5, the electronically controlled mechanical watch also includes a rectifying circuit 40, a power supply circuit 50, and a rotation controller 60. The electronically controlled mechanical watch is operated and controlled by those components.

More specifically, the power generator 20 is driven by the main spring 1*a* through the sped-up train wheels 7–11, and produces inductive electromotive forces for supplying electrical energy. The AC power from the power generator 20 is boosted and rectified through the rectifying circuit 40 which functions to perform boosting rectification, full-wave rectification, half-wave rectification, transistor rectification, or the like. The rectified power is supplied to and charged in the power supply circuit 50 comprising a capacitor or the like. In this embodiment, though not shown in FIGS. 1–5, the power generator 20 is provided with a brake circuit including the rectifying circuit 40. The brake circuit serves to govern the speed of the minute hand 13, the second hand 14, etc.

The brake circuit is controlled by the rotation controller 60 that is driven with power that is supplied from the power supply circuit 50. As shown in FIG. 5, the rotation controller 60 comprises an oscillation circuit 61, a detection circuit 62 and a control circuit 63.

The oscillation circuit 61 outputs a reference signal $f_s$ of 5 Hz using a quartz oscillator 61A as a time standard source.

The detection circuit 62 comprises a waveform shaping circuit and a monomultivibrator which are connected to the power generator 20. The waveform shaping circuit comprise an amplifier and a comparator, and transforms a sinusoidal wave into a rectangular wave. The monomultivibrator functions as a band-pass filter allowing pulses having a period not less than a certain value to pass through the same, and outputs a rotation detection signal FG1 without noise.

The control circuit 63 comprises an up-and-down counter, a synchronizing circuit, and a chopper circuit. The control circuit 63 receives the reference signal $f_s$ from the oscillation circuit 61 and the rotation detection signal FG1 from the detection circuit 62, and based on those signals, $f_s$ and FG1, controls the brake circuit.

Figure 6:
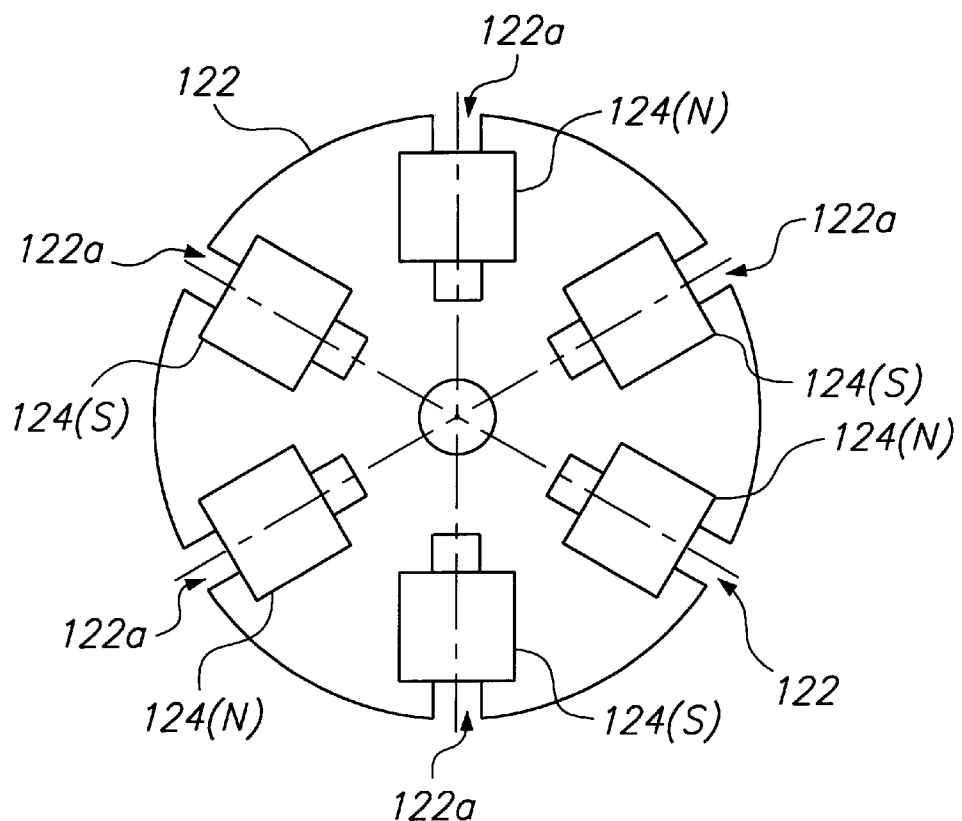
FIG. 6 is a plan view showing a back yoke and magnetic bodies which are components of the multipolar power generator according to the first embodiment.

As shown in FIG. 6, the back yoke 122 as one component of the rotor 12 is constituted by a disk made of soft iron. Six magnets 124 are disposed on a surface of the back yoke 122 in symmetrical fashion about the rotary shaft, and these magnets 124 are arranged with N and S poles arrayed alternately in the direction of rotation. Further, in a portion of the back yoke 122 where each magnet 124 is positioned, a cutout 122*a* is formed, extending from the outer periphery of the back yoke 122 radially toward the center of rotation. The width of each cutout 122*a* extends across the center of the magnetic pole of the corresponding magnet 124.

Figure 7:
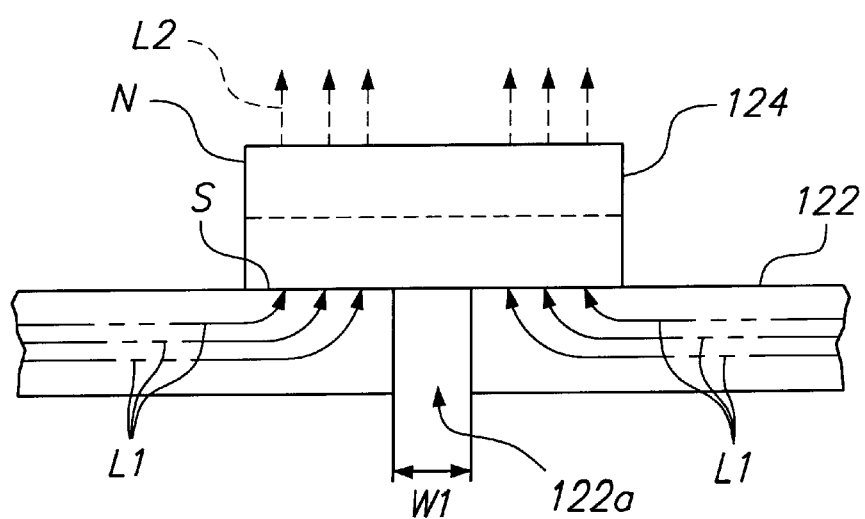
FIG. 7 is a schematic view for explaining flows of magnetic force lines inside the back yoke in the first embodiment.

As shown in FIG. 7, which is a side view of the back yoke 122 showing one of the cutouts 122*a* and the corresponding magnet 124, the cutout 122*a* is formed in a portion where the density of magnetic force lines is low based on distribution of magnetic force lines L1 produced inside the back yoke 122 by the adjacent magnets 124. The width W1 of the cutout 122*a* is selected so as to avoid saturation of the magnetic flux in a region where the back yoke 122 and the magnet 124 are in close contact, and to prevent a reduction of the density of the magnetic force lines L2 which are radiated from an upper surface of the magnet 124.

The back yoke 123 and the magnets 125 also have substantially the same structure as that of the back yoke 122 and the magnets 124, but the back yoke 123 is mounted 60° out of phase in the rotating direction of the rotor 12 with respect to the mount position of the back yoke 122 on the rotor shaft 121. The opposing magnets 124 and 125 are arranged such that different poles face to each other.

The operation of the above-described power generator 20 will be next described.

(1) The movement barrel 1 is rotated by the unwinding motion of the main spring 1*a*, and the rotor 12 is rotated through the sped-up train wheels 7–11.

(2) Upon the rotation of the rotor 12, the magnetic force lines L2 which penetrate the stator 15 are successively changed above and below the stator 15 due to the rotating magnets 124 and 125 with N and S poles arrayed alternately in the direction of rotation. Correspondingly, an induced current is produced in each coil 152 formed on the stator 15.

(3) The induced current produced in the stator 15 is supplied to the rotation controller 60 through the rectifying circuit 40 and the power supply circuit 50.

Then, the rotation controller 60 controls the operation of the brake circuit to perform speed governing of the electronically controlled mechanical watch.

The above-described power generator 20, i.e., the multipolar power generator according to the first embodiment, has the following advantages.

By forming the cutouts 122a in the back yoke 122 as described, the weight of the back yoke 122 can be reduced and hence the overall weight of the rotor 12 can be reduced. Correspondingly, the rotor shaft 121 can be thinned and the efficiency of power generation can be improved. In addition, a reduction of the weight of the rotor 12 contributes to simplifying and downsizing the structure of the antivibration bearing 31, thus resulting in a reduction of both size and weight of the power generator 20.

Also, since the rotor 12 comprises the plurality of magnets 124, 125 arranged on the back yokes 122, 123, the rotor 12 can be constructed by arranging the magnets 124 and 125 in the least necessary portions; that is, in a small portion of the total operative area. Consequently, the weight of the power generator 20 can be further reduced.

Since the surface area and volume of the back yoke 122, 123 is reduced by forming the cutouts 122a to extend from the outer periphery of the back yoke 122, 123 toward the center of rotation, the weight of the back yoke 122, 123 can be reduced by simple machining which, in turn, simplifies the manufacture of the rotor 12.

Since the cutouts 122a are formed at the centers of the magnetic poles of the magnets 124, 125 where the density of magnetic force lines L1 is low, the magnetic flux is prevented from being saturated in the regions where the back yokes 122, 123 and the magnets 124, 125 are in close contact. As a result, the weight of the rotor 12 can be reduced without diminishing the density of the magnetic force lines L2 which are radiated from the magnets 124, 125.

Additionally, by providing the power generator 20 having the above construction in the electronically controlled mechanical watch, the size and thickness of the electronically controlled mechanical watch can also be reduced based on the reduction in size and thickness of the power generator 20.

A multipolar power generator according to a second embodiment of the present invention will be described below. Components or members which have been described above are denoted by the same numerals in the following, and their description is omitted or abridged.

In the above first embodiment, the weight of the back yokes 122, 123 is reduced by forming the cutouts 122a to extend from the outer periphery of the disk toward the center of rotation and arranging the magnets 124, 125 at positions radially inward of the cutouts 122a.

Figure 8:
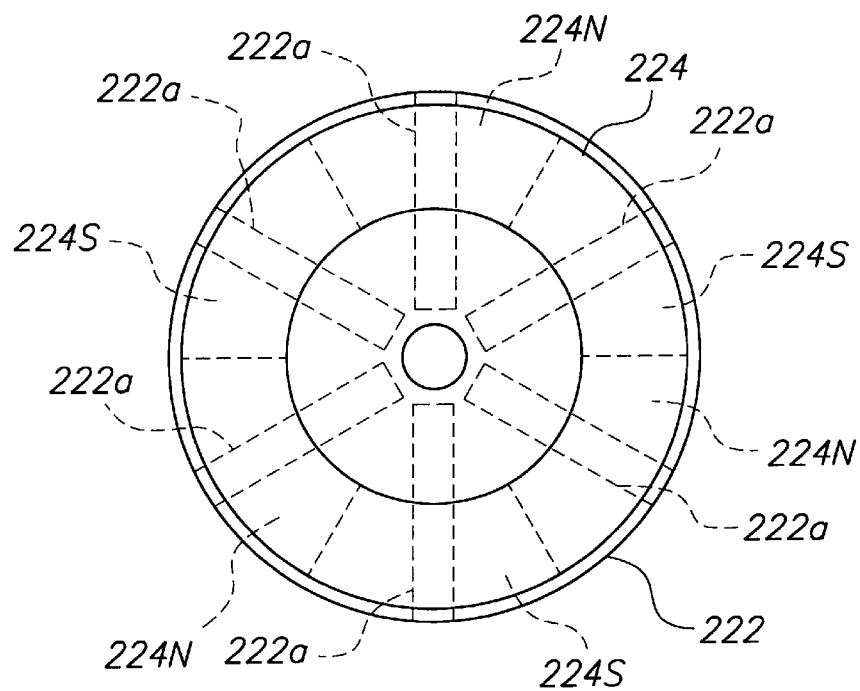
FIG. 8 is a plan view showing a back yoke and magnetic bodies which are components of a multipolar power generator according to a second embodiment of the present invention.
Figure 9:
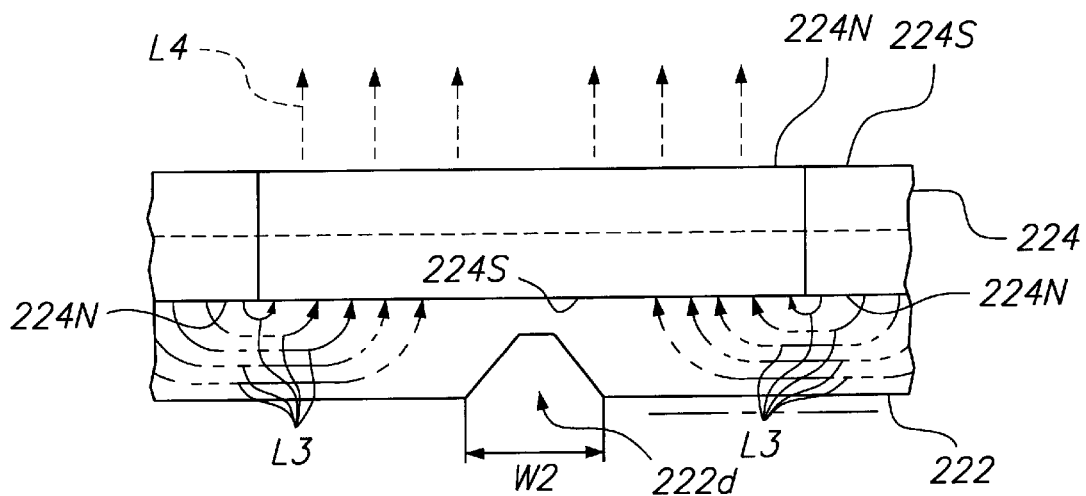
FIG. 9 is a schematic view for explaining flows of magnetic force lines inside the back yoke in the second embodiment.

A back yoke 222 which is one component of a rotor of the multipolar power generator according to the second embodiment differs from that in the first embodiment as follows. As shown in FIGS. 8 and 9, the back yoke 222 is comprised of an annular magnetic body 224 which is magnetized into six poles. The weight of the back yoke 222 is reduced by forming recesses 222a in one surface. The other surface of the back yoke 222 is in close contact with the annular magnetic body 224.

Referring to FIG. 8, the annular magnetic body 224 is magnetized into six poles 224N and 224S such that the N and S poles are alternately arrayed in each of upper and lower surfaces. The recesses 222a formed in the back yoke 222 are in the form of grooves positioned at the centers of the magnetic poles 224N and 224S and extended from the outer periphery of the back yoke 222 toward the center of rotation. As shown in FIG. 8, the recesses 222a are formed in one surface of the back yoke 222 while the other surface thereof is in close contact with the annular magnetic body 224. Moreover, the section of each recess 222a is tapered to gradually narrow toward the bottom of the recess. As with the first embodiment, an opening width W2 of the recess 222a can be made larger so long as the opening is positioned in an area where the density of magnetic force lines L3 is low, and so long as the magnetic flux is not saturated in a region where the back yoke 222 and the annular magnetic body 224 are in close contact, i.e., the density of magnetic force lines L4 radiated from the magnetic poles 224N, etc. is not diminished.

The other structure and operation of the multipolar power generator are similar to those of the multipolar power generator 20 according to the first embodiment, and therefore are not described here.

The second embodiment described above has the following advantages in addition to those of the first embodiment.

Since the magnetic body is formed by magnetizing each surface of the annular magnetic body 224 into six poles, the multipolar structure of the rotor can be formed just by attaching one piece of the annular magnetic body 224 onto the back yoke 222 to simplify the manufacture of the multipolar power generator.

Further, since the magnetic body 224 is in the annular form, the strength of the disk is less impaired with the recesses 222a formed in the rear surface of the back yoke 222. In addition, a closely contacted area between the annular magnetic body 224 and the back yoke 222 can be sufficiently maintained.

A third embodiment of the present invention will be described below.

In the multipolar power generators according to the above first and second embodiments, the weight of the back yokes 122, 222 is reduced by forming cutouts 122a or recesses 222a in the back yokes 122, 222.

Figure 10:
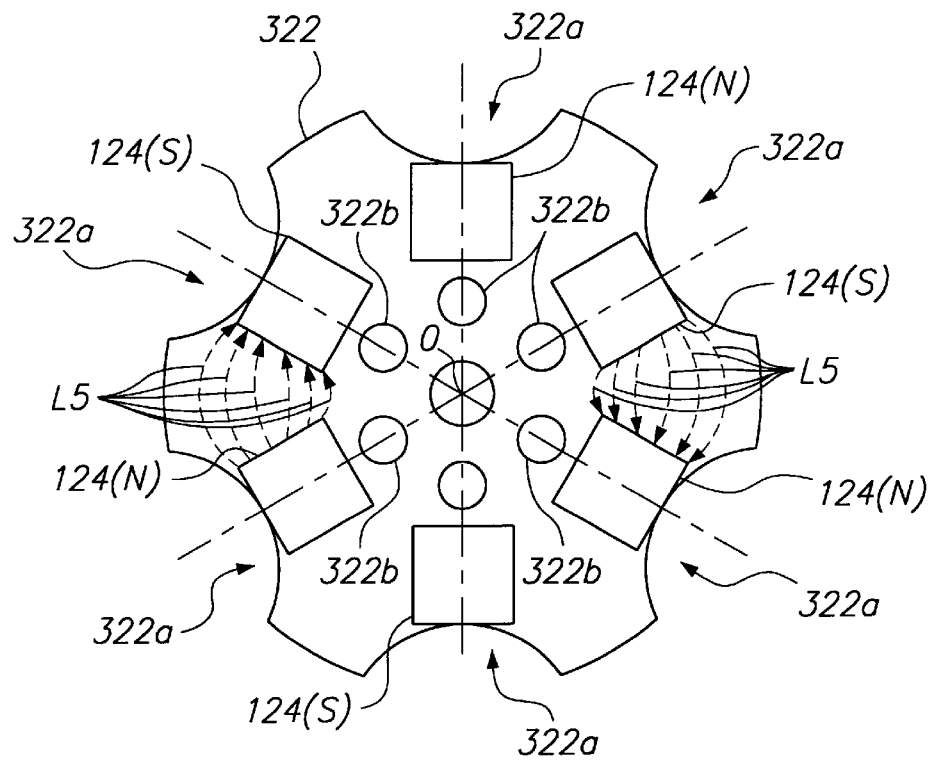
FIG. 10 is a plan view showing a back yoke and magnetic bodies which are components of a multipolar power generator according to a third embodiment of the present invention.

A multipolar power generator according to this third embodiment differs from those according to the first and second embodiments as follows. As shown in FIG. 10, the weight of a back yoke 322 is reduced with recesses 322a formed by cutting out an outer peripheral edge of the back yoke 322 at positions corresponding to the plurality of magnets 124 disposed on the back yoke 322, and forming holes 322b inwardly of the magnets 124.

In FIG. 10, the recesses 322a are each positioned outwardly of each magnet 124 so as to gradually open in the outward direction, and the base of each recess 322a lies on a line connecting the center of rotation (O) and the center of the pole of the corresponding magnet 124. The holes 322b are each formed inwardly of the corresponding magnet 124, and the center of each hole 322b lies on the line connecting the center of rotation (O) and the center of the pole of the corresponding magnet 124. As shown in FIG. 10, each recess 322a and hole 322b is formed in an area where the density of magnetic force lines L5 produced between the N and S poles of the adjacent magnets 124 along the surface of the back yoke 322 is low.

The other structure and operation of the multipolar power generator according to the third embodiment are similar to those of the multipolar power generator 20 according to the first embodiment, and therefore are not described here.

The multipolar power generator according to the third embodiment described above has the following advantages in addition to those of the first embodiment.

Since the recesses 322a and the holes 322b are formed in the back yoke 322 in two-dimensional fashion, a larger cutout area of the back yoke 322 can be securely obtained, and the weight of the rotor, including the back yoke 322, can be much reduced. It is therefore possible to further improve the power generation efficiency of the multipolar power generator, and reduce the weight and size thereof.

A fourth embodiment of the present invention will be described below.

In the above first embodiment, the weight of the back yoke 122 is reduced by forming the cutouts 122a to extend from the outer periphery of the back yoke 122 toward the center of rotation at positions corresponding to the positions of the magnets 124.

Figure 11:
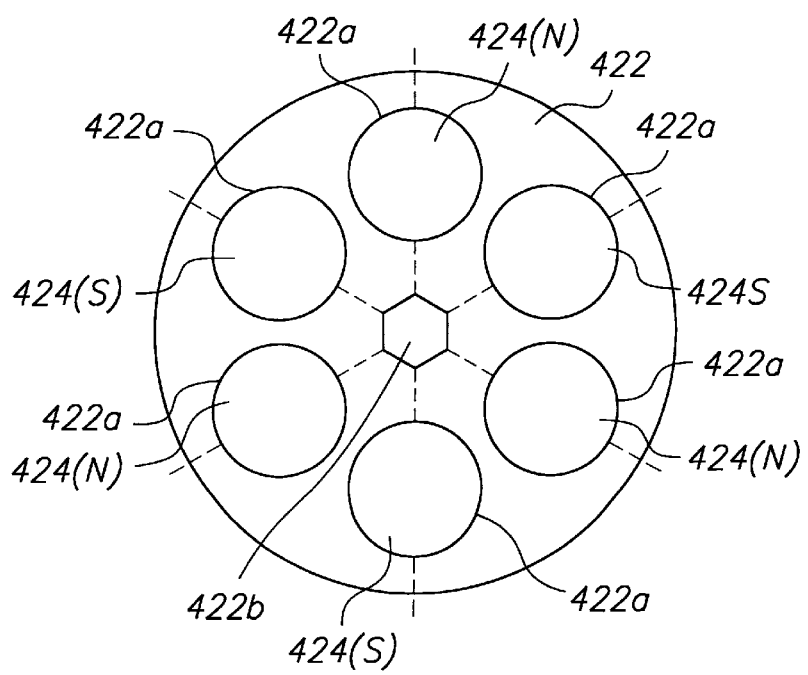
FIG. 11 is a plan view showing a back yoke and magnetic bodies which are components of the multipolar power generator according to a fourth embodiment of the present invention.
Figure 12:
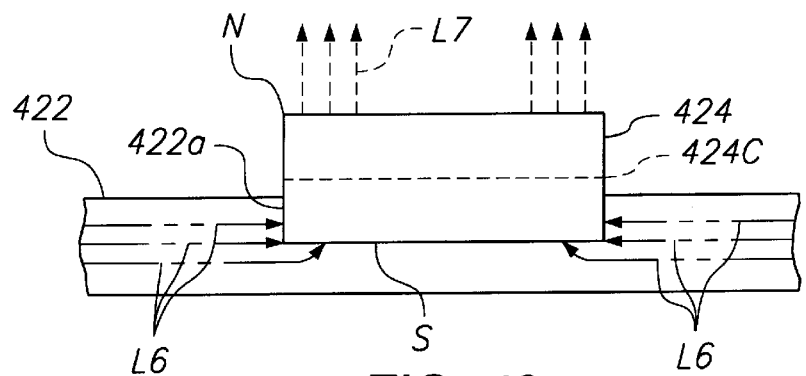
FIG. 12 is a schematic view for explaining flows of magnetic force lines inside the back yoke in the fourth embodiment.

In this fourth embodiment, as shown in FIGS. 11 and 12, the weight of the back yoke 422 is reduced by forming recesses 422a in the back yoke 422 at predetermined positions.

Columnar magnets 424 are fitted into the recesses 422a formed in the back yoke 422 with a substantial portion of the lower half of each magnet embedded in the back yoke 422, as shown in FIG. 12. The depth of each recess 422a is set to such a dimension that when the magnet 424 is fitted in place, the boundary 424c between poles of the magnet 424 slightly projects from the surface of the back yoke 422. Magnetic force lines L6 passing inside the back yoke 422 flow into the magnet 424 from bottom and side surfaces thereof on the lower S-pole side, and magnetic force lines L7 radiate upward from the upper N-pole side.

Also, while the central hole of the back yoke 122 in which the rotor shaft 121 is inserted is circular in the above first embodiment, the central hole 422b of the back yoke 422 is hexagonal in this fourth embodiment as shown in FIG. 11. Corresponding to the hexagonal hole 422b, the rotor shaft is formed to have a hexagonal radial section (though not shown). The central hole 422b and the rotor shaft, both being hexagonal, cooperate to constitute a positioning means for positioning a pair of back yokes 422 relative to each other.

Further, the centers of the circular recesses 422a are positioned to lie on respective lines radially extending radially outward from the six apexes of the hexagonal hole 422b at the center of rotation.

When manufacturing the rotor according to this embodiment, the back yoke 422, with the recesses 422a and holes 422b formed therein, is first molded by casting, and then the magnets 424 are fitted into the recesses 422a. In the magnet fitting step, the magnets 424 can be securely mounted on the back yoke 422 without using an adhesive because the magnets 424 are restricted from moving along the surface of the back yoke 422 which is held in close contact with the magnets 424 in the recesses 422a. The magnets 424 adhere to the back yoke 422 under attraction with magnetic forces produced by the magnets 424.

Two pieces of the back yokes 422 including the magnets 424 thus mounted thereon are fitted over the rotor shaft and fixed with the two back yokes 422 being 6020 out of phase from each other. The two back yokes 422 are thereby automatically positioned such that N and S poles of corresponding magnets 424 oppose each other. The other structure and operation are similar to those of the first embodiment, and therefore are not described here.

The fourth embodiment described above has the following advantages in addition to those of the first embodiment.

Since the magnets 424 are fitted into the recesses 422a, a contact area between the magnets 424 and the back yoke 422 is increased. Accordingly, the magnetic force lines L6 inside the back yoke 422 flow into the magnets 424 more easily, and the magnetic force lines L7 radiated from the magnets 424 are increased, thus resulting in a multipolar power generator which has higher power generation efficiency of power.

Also, movement of the magnets 424 along the surface of the back yoke 422 held in close contact with the magnets can be restricted due to fitting of the magnets 424 into the recesses 422a of the back yoke 422, and movement of the magnets 424 in the direction outward of the surface of the back yoke 422 can be restricted under attraction of magnetic forces produced by the magnets 424. Therefore, the magnets 424 can be held on the back yoke 422 with no need of bonding the magnets 424 to the back yoke 422 using an adhesive or the like. This increases the efficiency in manufacture of the rotor including the back yoke 422. However, when the multipolar power generator including the rotor according to this embodiment is used in portable electronic devices, such as a watch or a cellular phone, where the magnets 424 may possibly detach from the back yoke 422 due to vibrations, detachment of the magnets can be surely prevented by using an adhesive or the like.

Further, since the depth of each recess 422a is set to such a dimension that the boundary 424c between poles of the magnet 424 slightly projects from the surface of the back yoke 422, the magnetic poles are not susceptible to twisting or the like. Accordingly, the magnetic force lines L6 inside the back yoke 422 are allowed to smoothly flow into the magnets 424, and the magnetic force lines L7 radiated from the magnets 424 to penetrate the coils can be increased. As a result, a multipolar power generator with higher efficiency of power generation can be achieved.

Since the recesses 422a and the magnets 424 are circular in plan view, manufacture of the back yoke 422 and the magnets 424 can be facilitated.

With the provision of the positioning means comprising the hexagonal rotor shaft and the hexagonal hole 422b formed in the back yoke 422, relative positions of the back yokes 422 in pair can be set so that magnetic force lines flow most efficiently, and therefore great changes of magnetic flux can be applied to the coils between the pair of the back yokes 422.

Since the positioning means comprises the hole 422b and the rotor shaft, both of which are hexagonal, the rotor positioned with high accuracy can be easily manufactured.

Additionally, since the magnets 424 are arranged in opposed relation to the apexes of the hexagonal hole 422b, a sectional area of the back yoke 422 can be reduced by cutting out portions of the back yoke 422 where the density of magnetic flux produced by the plurality of magnets 424 is low, and the weight of the back yoke 422 can be further reduced as with the third embodiment.

A fifth embodiment of the present invention will be described below.

In the rotor as one component of the multipolar power generator according to the fourth embodiment, the columnar magnets 424 are employed and the columnar recesses 422a are formed to receive the magnets 424 for mutual fitting.

Figure 13:
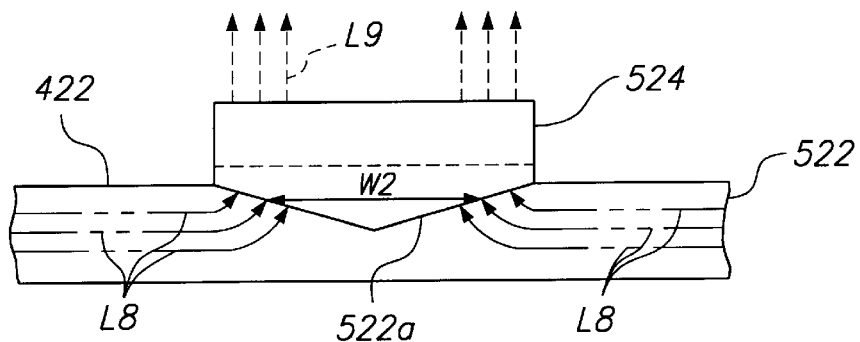
FIG. 13 is a schematic view for explaining flows of magnetic force lines inside the back yoke in a fifth embodiment of the present invention.

A rotor as one component of a multipolar power generator according to the fifth embodiment differs from the rotor in the fourth embodiment as follows. As shown in FIG. 13, recesses 522a formed in a back yoke 522 are each configured such that a width W of each recess 522a in the direction perpendicular to the direction of depth thereof gradually decreases toward the bottom of the recess. Also, the magnet 524 fitted into each of the recesses 522a is configured with a shape corresponding to that of the recess 522a.

The magnet 524 has a rectangular shape in plan view, and its fore end portion has a triangular shape in side view. Slopes of the triangular shape are extended in the direction perpendicular to magnetic force lines L8 inside the back yoke 522, as shown in FIG. 13, so that the magnetic force lines L8 smoothly flow into the magnet 524. The other structure is similar to that of the fourth embodiment, and therefore is not described here.

The multipolar power generator provided with the rotor according to the fifth embodiment described above has the following advantages in addition to those of the fourth embodiment.

With the recess 522a having the shape described above, the magnetic force lines L8 passing inside the back yoke 522 smoothly flow into the magnet 524 into the direction perpendicular to slopes of a portion of the magnet 524 which is fitted into the recess 522a, and magnetic force lines L8 radiated from the magnet 524 to penetrate the coil are further increased. Accordingly, by using the rotor including the above-described back yoke 522, a multipolar power generator with higher efficiency of power generation can be achieved.

A sixth embodiment of the present invention will be described below.

In the above first to fifth embodiments, the electromagnetic transducer according to the present invention is utilized as a multipolar power generator.

On the other hand, in this sixth embodiment, the electromagnetic transducer according to the present invention is utilized as a motor.

Figure 14:
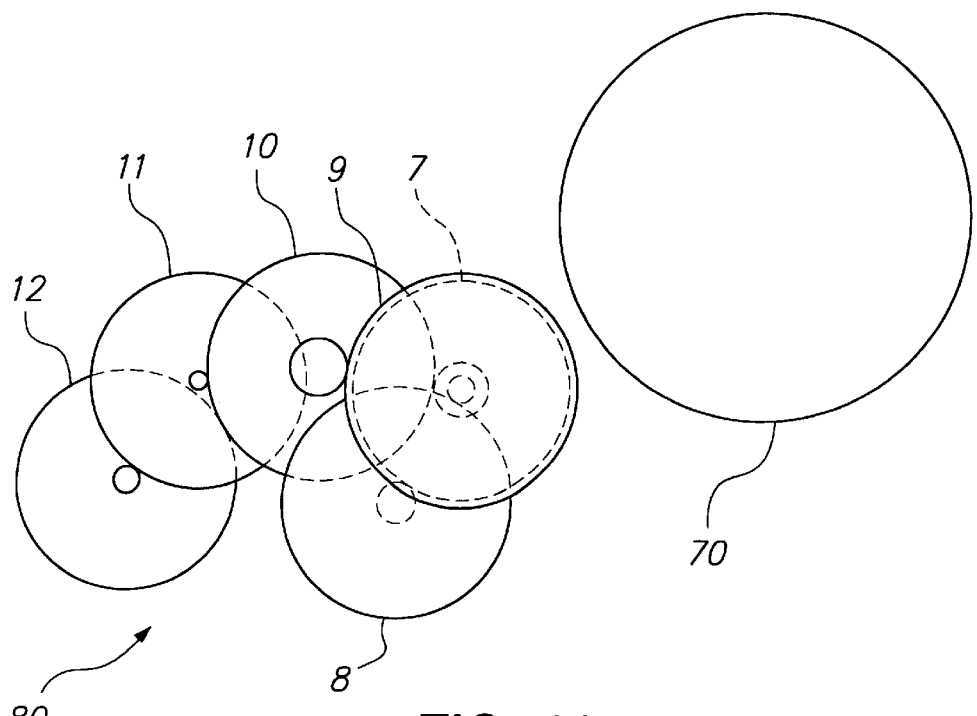
FIG. 14 is a plan view showing the structure of principal part of an electronic device utilizing a motor according to a sixth embodiment of the present invention.

As shown in FIG. 14 which illustrates the principal structure, an electronically controlled watch according to this embodiment comprises train wheels 7–11 and a rotor 12 similar to the first embodiment, but includes a battery 70 instead of the movement barrel accommodating the main spring. Electrical energy from the battery 70 is supplied to a motor 80 to rotate the rotor 12. With the rotation of the rotor 12, the train wheels 7–11 are rotated to operate a minute hand attached to the wheel 7 and a second hand attached to the wheel 9.

Figure 15:
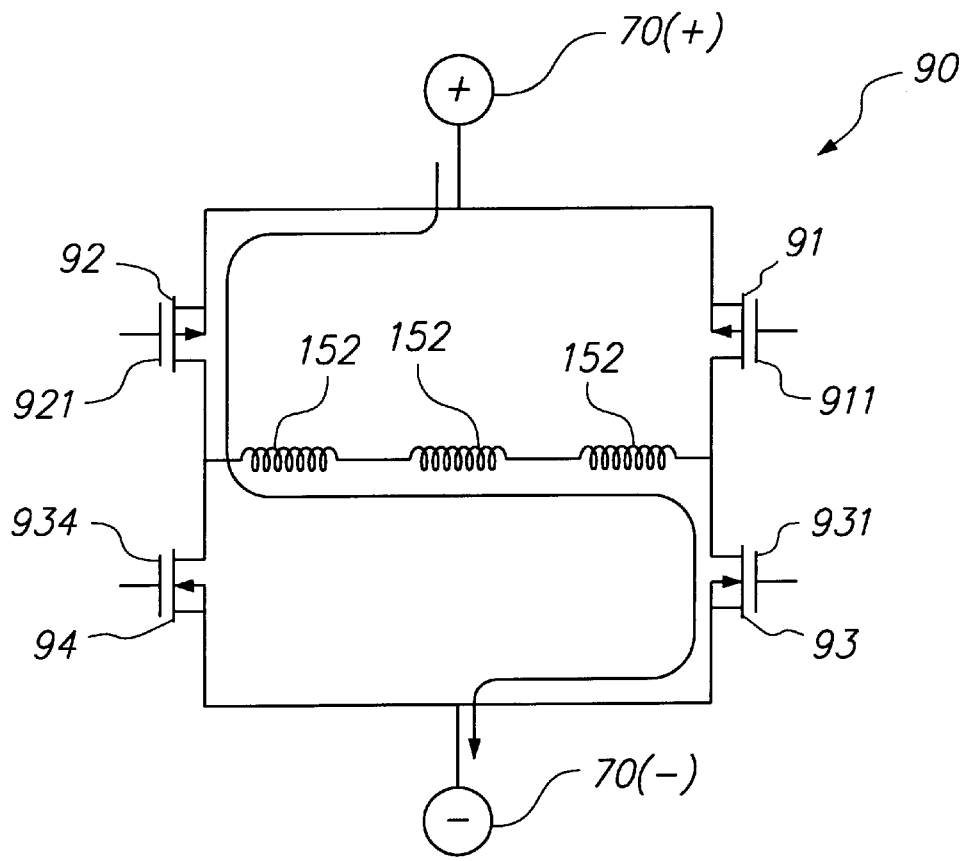
FIG. 15 is a schematic view representing control of the direction of a current flowing through a coil in the sixth embodiment.

The motor 80 has the same structure as the multipolar power generator 20 according to the first embodiment (see FIGS. 3 and 4). A stator similar to that in the first embodiment is disposed between a pair of back yokes which are components of the rotor 12. Current from the battery 70 flows through coils formed on a base plate of the stator, whereupon a magnetic field is generated to rotate the rotor 12. More specifically, as shown in FIG. 15, three coils 152 formed on the base plate of the stator are connected in series, thereby constituting a drive circuit 90. The drive circuit 90 is connected at one end to a positive (+) terminal of the battery 70 and at the other end to a negative (−) terminal thereof.

In addition to the three coils 152 connected in series, the drive circuit 90 also comprises two P-channel MOS transistors 91, 92, and two N-channel MOS transistors 93, 94. Gates 911, 921, 931, 934 of these transistors 91–94 serve as input terminals. By applying a low- or high-level voltage to the gates 911, 921, 931, 934, the direction of a current flowing through the coils 152 is changed. Specifically, current flows through the coils 152 as follows.

(1) When the voltages applied to the gates 911, 921, 931, 934 are all at a low level, the two P-channel MOS transistors 91, 92 are turned on to constitute a closed circuit including the coils 152. At this time, no current flows through the coils 152 and therefore no effects are applied to the rotor 12.

(2) When the voltages applied to the gates 911, 931 are turned to a high level in the above condition, current flows through the coils 152 as indicated by an arrow in FIG. 15, whereupon the magnetic field near the stator is changed to rotate the rotor 12. Then, the rotor 12 stops in a balanced position.

(3) When the voltages applied to the gates 911, 931 are returned to a low level and the voltages applied to the gates 921, 941 are turned to a high level, contrary to the above condition, current flows through transistors 91 and 94 and through the coils 152 in the reverse direction. The magnetic field is thereby generated in the reverse direction to further rotate the rotor 12.

By changing a combination of voltages applied to the transistors 91–94 to repeatedly change the direction of the current through the coils 152 in such a manner, the rotor 12 is continuously rotated, causing the minute hand and the second hand to operate.

The sixth embodiment described above has advantages below.

By providing the battery 70 and the drive circuit 90, the electromagnetic transducer having the same structure as the multipolar power generator 20 according to the first embodiment can be used as the motor 80.

Also, by employing the motor 80 to construct an electronically controlled watch, the rotor 12 can be continuously rotated because the weight of the rotor 12 including the back yokes is reduced. An electronically controlled watch capable of moving the second hand continuously can be therefore realized. This result contributes to eliminating the dissatisfaction some users have experienced with electronically controlled watches of having second hands that move intermittently and often do not stop precisely at the second gradations formed at pitches of 60° on the watch dial.

It is to be noted that the present invention is not limited to the above embodiments, but includes the following modifications as well.

Figure 16:
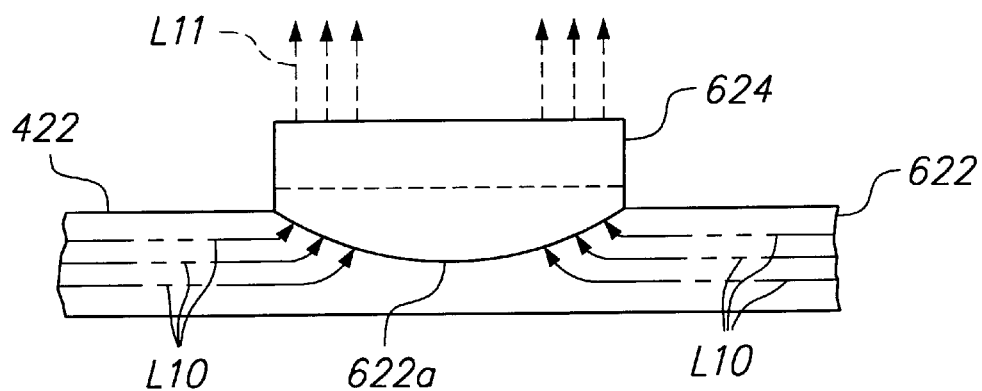
FIG. 16 is a schematic view for explaining flows of magnetic force lines inside a back yoke as one component of a multipolar power generator which is a modification of the fourth embodiment.

While in the above fourth embodiment the recess 522a is rectangular in plan view and triangular in side view, the present invention is not limited to such a shape of the recess 522a. Specifically, as shown in FIG. 16, a recess 622a may be formed in a back yoke 622 to have a circular shape in plan view with its bottom curved along a circumference, and a portion of a magnet 624 which is fitted into the recess 622a may be formed to have a spherical shape.

By forming the recess 622a into such a shape, the direction of incidence of magnetic force lines L10 from the back yoke 622 to the magnet 624 can be aligned with the direction normal to the spherical surface of the magnet 624, and magnetic force lines L11 radiated from the magnet 624 can be further increased.

Figure 17:
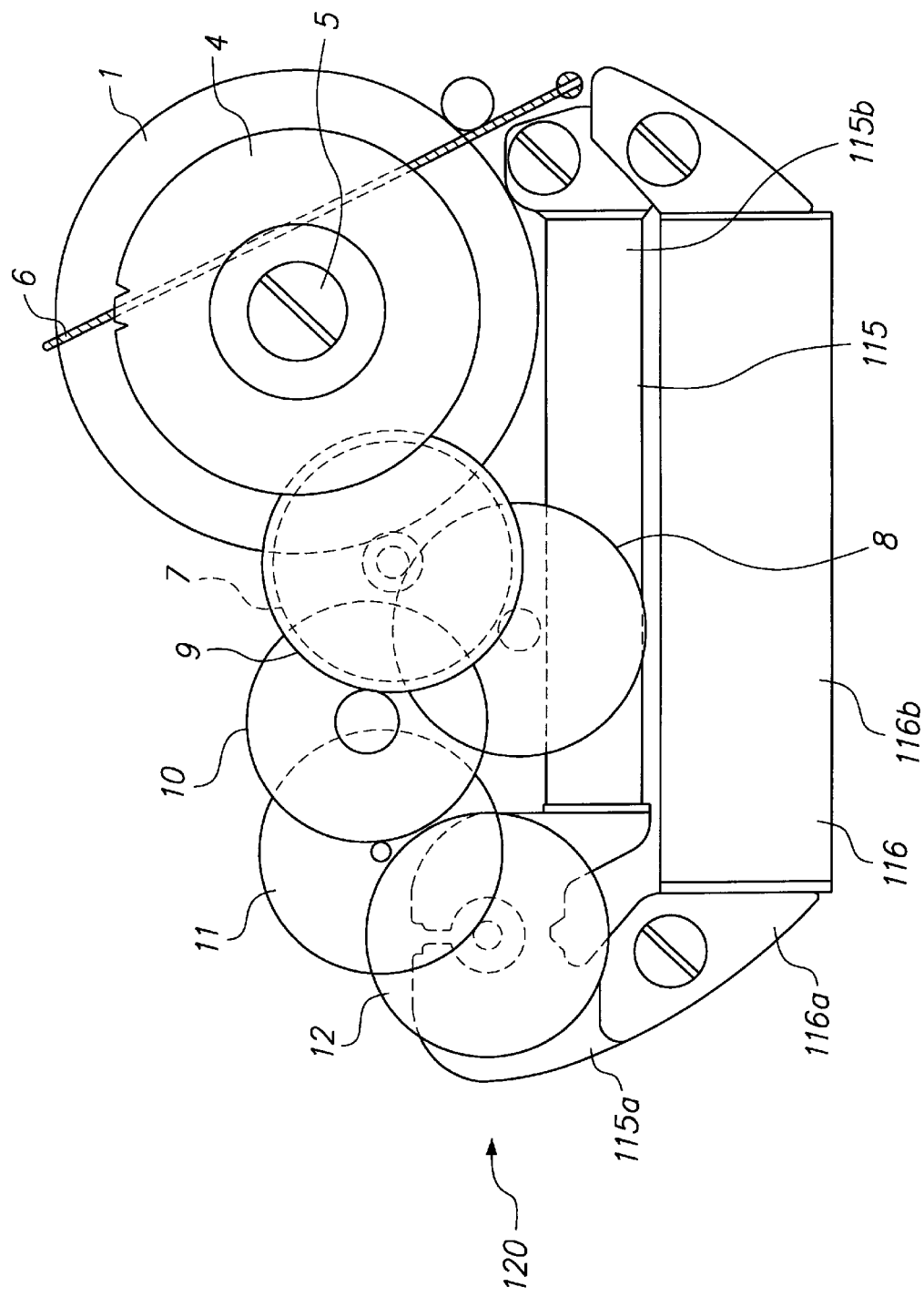
FIG. 17 is a plan view showing the structure of an electronic device utilizing a multipolar power generator which is a modification of the first embodiment of the present invention.
Figure 18:
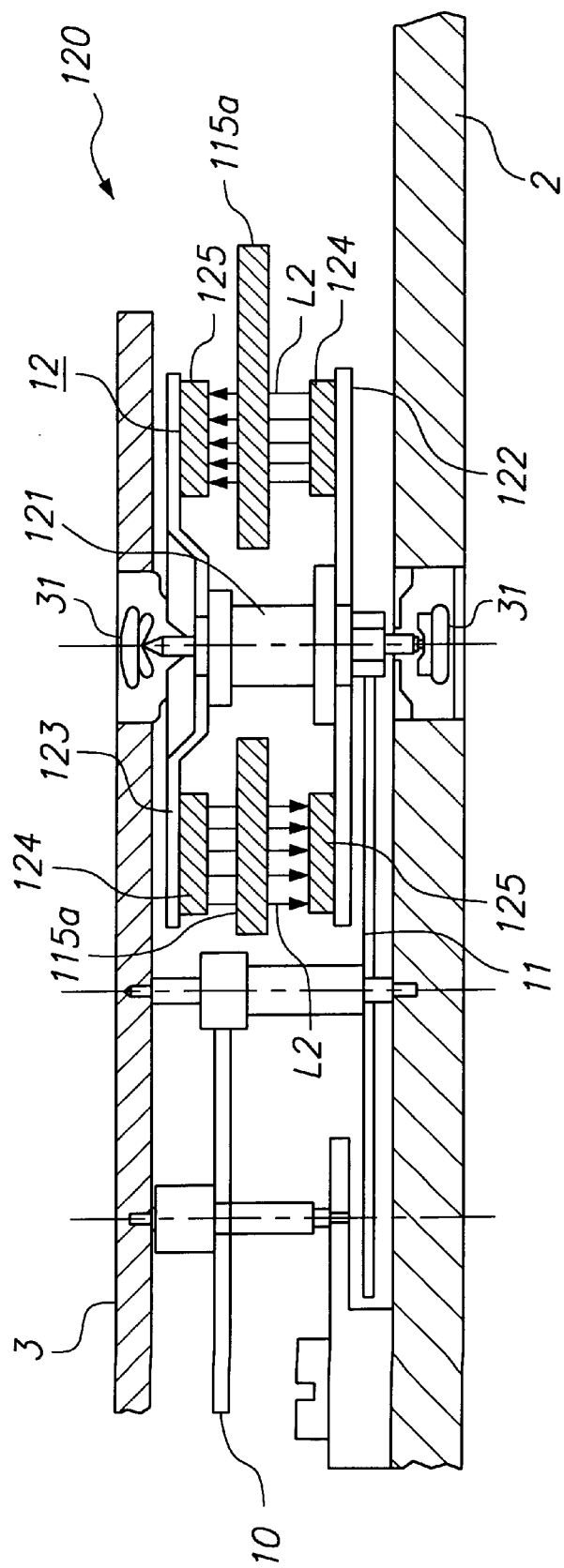
FIG. 18 is a sectional view showing the structure of the electronic device according to the modification of FIG. 17.

While, in the multipolar power generator 20 according to the first embodiment, the stator 15 including the coils 152 formed thereon interposed between the back yokes 122 and 123, the present invention is not limited to such a structure. Specifically, as shown in FIGS. 17 and 18, the present invention may use a stator 115 constituted by interposing only a stator member 115a between the back yokes 122 and 123, and winding a stator coil 115b over a separate stator member 115a.

Since only the stator member 115a is interposed between the back yokes 122 and 123, the structure of such a multipolar power generator 120 is advantageous in reducing the thickness of the multipolar power generator 120. Further, as shown in FIG. 17, a magnetic core 116a may be connected to the stator member 115a in addition to the stator member 115b, and a coil 116b may be wound over the magnetic core 116a to form a coil block 116, the coil 116b being connected to the stator coil 115b in series, for example. With such an arrangement, an output voltage of the multipolar power generator 120 can be set to various values. In the case of the multipolar power generator 120, however, the number of windings of the stator coil 115b and the coil 116b is preferably set to about 15,000 turns depending on coil resistance, etc.

While in the first embodiment the magnetic body comprises a plurality of magnets 124 and the cutouts 122a are formed to extend from the outer periphery of the back yoke 122 toward the center of rotation, the present invention is not limited to such a structure. More specifically, similar advantages to those in the first embodiment can also be obtained in the case of combining the back yoke including the cutouts formed therein with the annular magnetic body 224 used in the second embodiment.

While in the second embodiment the annular magnetic body 224 is held in close contact with the front surface of the back yoke 222 with the recesses 222a formed in the rear surface thereof, a magnetic body comprising a plurality of magnets may be arranged on the back yoke 222.

While in the third embodiment the holes 322b are circular, the shape of the holes 322b is not so limited; the holes may alternatively be oblong. In other words, the shape and dimension of the holes 322b can be determined appropriately depending on distribution of the magnetic force lines L5.

While in the first embodiment the rotor 12 is rotated upon the unwinding motion of the main spring 1a, the present invention is not limited to such a structure. As an alternative, the rotor may be rotated by transmitting rotation of a rotating weight through the train wheels, etc. Thus, the present invention can be embodied in any type of multipolar power generator wherein a rotor is rotated with mechanical energy in any form.

While in the first embodiment the multipolar power generator 20 is used as a power supply source for an electronically controlled mechanical watch, the present invention is not limited to such an application. The present invention is also applicable to other types of electronic devices such as a cellular phone.

Further, the methods of reducing the weight of the back yoke, which have been described in the first to fifth embodiments, can also be applied to the motor according to the sixth embodiment. The driving efficiency of the motor can be remarkably improved by employing a back yoke having the thus-reduced weight.

While in the electromagnetic transducers according to the first to sixth embodiments the magnetic body is provided on each of the paired back yokes, the present invention is not limited to such a structure. The magnetic body may be provided on only one of the paired back yokes, whereas no magnetic body may be provided on the other. In this modification, any of the methods of reducing the weight of the back yoke, which have been described in the first to sixth embodiments, can also be applied to the back which includes the magnetic body.

It should be understood that concrete structures, shapes, etc. used in implementing the present invention can be modified in various ways within the scope of achieving the objects of the present invention.

According to the multipolar power generator of the present invention, as described above, since a sectional area of the back yoke is reduced to such an extent that the magnetic flux passing inside the back yoke is not saturated, the weight of the back yoke can be reduced and hence the overall weight of the rotor can be reduced. It is therefore possible to thin the rotor shaft and to improve the power generation and driving efficiency of a motor.

While the invention has been described in conjunction with several specific embodiments, many further alternatives, modifications and variations will be apparent to those skilled in the art in light of the foregoing description. Thus, the invention described herein is intended to embrace all such alternatives, modifications, applications and variations as may fall within the spirit and scope of the appended claims.

What is claimed is:

1. An electromagnetic transducer comprising a rotor and a coil converting kinetic energy generated due to rotation of said rotor to electrical energy in said coil or for converting electrical energy generated in said coil to kinetic energy in the form of rotation of said rotor, wherein said rotor comprises a rotor shaft serving as the center of rotation of said rotor, and a back yoke including a plurality of magnetic body portions having N and S poles arrayed in the direction of rotation of said rotor, said magnetic body portions being held in close contact with said back yoke, and wherein said back yoke is formed with reduced volume regions, each of which is aligned with one of the plurality of said magnetic body portions, such that each region extends in a direction from an outer peripheral region of said back yoke toward the center of rotation through a center portion in a plan view of said magnetic body portions.

2. An electromagnetic transducer according to claim 1, wherein said magnetic body portions form an annular structure and the N and S poles are formed on said annular magnetic body by magnetizing a surface thereof.

3. An electromagnetic transducer according to claim 1, wherein said rotor includes a pair of back yokes arranged in opposing relationship to one another with coils disposed therebetween, and said rotor shaft includes a positioning structure adapted to determine relative positions of said pair of back yokes.

4. An electromagnetic transducer according to claim 1, wherein said rotor includes a pair of back yokes arranged in opposing relationship to one another with coils disposed therebetween, and said rotor shaft includes a positioning structure adapted to determine relative positions of said pair of back yokes, and wherein each of the poles of the magnetic body portions arranged on one of said pair of back yokes opposes a particular one of the poles of magnetic body portions arranged on the other back yoke.

5. An electromagnetic transducer according to claim 4, wherein said positioning structure includes a rotor shaft having a polygonal shape in a radial section, and polygonal holes formed in said pair of back yokes to receive said rotor shaft for mutual fitting.

6. An electromagnetic transducer according to claim 4, wherein said positioning structure includes a rotor shaft having a polygonal shape in a radial section, and polygonal holes formed in said pair of back yokes to receive said rotor shaft for mutual fitting, and wherein said polygonal holes each have a polygonal shape and are positioned based on the arrangement of said plurality of magnetic body portions, and each of said plurality of magnets is positioned to lie on a corresponding line extending outwardly from a corresponding one of the apexes of said polygonal shape in one-to-one relation.

7. An electronic device including said electromagnetic transducer according to claim 1.

8. An electronic device according to claim 7, wherein said rotor is rotated by transmitting kinetic energy accumulated in a main spring to said rotor through train wheels.

9. An electromagnetic transducer according to claim 1, wherein each reduced volume region comprises a cutout.

10. An electromagnetic transducer according to claim 9, wherein each of the plurality of cutouts is formed in an outer peripheral edge of said back yoke.

11. An electromagnetic transducer according to claim 1, wherein said plurality of magnetic body portions comprise a plurality of magnets with the N and S poles arrayed alternatively on said back yoke.

12. An electromagnetic transducer according to claim 11, wherein a plurality of cutouts are formed in an outer peripheral edge of said back yoke in radial alignment with the plurality of magnetic body portions on said back yoke.

13. An electromagnetic transducer according to claim 11, wherein a plurality of holes are formed in said back yoke in radial alignment with said plurality of magnetic body portions on said back yoke inward of said magnetic body portions.

14. An electromagnetic transducer according to claim 11, wherein a plurality of recesses are formed in said back yoke to receive said plurality of magnets for mutual fitting in one-to-one relation.

15. An electromagnetic transducer according to claim 14, wherein said plurality of recesses are each formed such that a width of each recess in the direction perpendicular to the direction of depth thereof gradually decreases toward the bottom of the recess, and a portion of each of said magnets which is fitted into each recess is configured to correspond to the shape of the recess.

16. An electromagnetic transducer according to claim 14, wherein the depth of said recesses is set based on a boundary between the poles of each of said plurality of magnets.

17. An electromagnetic transducer according to claim 14, wherein said plurality of recesses and said magnets are formed to have a circular shape in plan view.

18. An electromagnetic transducer according to claim 1, wherein the reduced volume region comprises a plurality of recesses formed in one surface of said back yoke, the other surface being held in contact with said magnetic body portions.

19. An electromagnetic transducer according to claim 18, wherein each of the plurality of recesses is in the form of grooves.

20. An electromagnetic transducer according to claim 19, wherein a depth of each of the plurality of recesses is tapered from a top of that recess toward a bottom of that recess.

21. An electromagnetic transducer according to claim 20, wherein each recess is triangular in shape in side view.

22. An electromagnetic transducer according to claim 18, wherein each of the plurality of recesses is circular in shape in plan view.

23. An electromagnetic transducer according to claim 18, wherein a bottom of each recess is curved.

* * * * *

UNITED STATES PATENT AND TRADEMARK OFFICE
CERTIFICATE OF CORRECTION

PATENT NO. : 6,208,055 B1
DATED : March 27, 2001
INVENTOR(S) : Osamu Takahashi

It is certified that error appears in the above-identified patent and that said Letters Patent is hereby corrected as shown below:

<u>Column 16,</u>
Line 29, please add -- for -- between "coil" and "converting".
Line 43, please change "voke" to -- yoke --.

Signed and Sealed this

Twenty-third Day of October, 2001

Attest:

NICHOLAS P. GODICI
*Attesting Officer*     *Acting Director of the United States Patent and Trademark Office*